(12) United States Patent
Ohasi et al.

(10) Patent No.: US 7,531,987 B2
(45) Date of Patent: May 12, 2009

(54) CAPACITOR CONTROL SYSTEM

(75) Inventors: Tosihiko Ohasi, Osaka (JP); Kimiyasu Kakiuchi, Osaka (JP); Yohsuke Mitani, Osaka (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 11/547,396

(22) PCT Filed: Apr. 6, 2005

(86) PCT No.: PCT/JP2005/006738

§ 371 (c)(1),
(2), (4) Date: Oct. 2, 2006

(87) PCT Pub. No.: WO2005/099062

PCT Pub. Date: Oct. 20, 2005

(65) Prior Publication Data

US 2007/0210761 A1     Sep. 13, 2007

(30) Foreign Application Priority Data

Apr. 7, 2004  (JP) .............................. 2004-112963

(51) Int. Cl.
*H02J 7/00* (2006.01)
(52) U.S. Cl. .................. 320/116; 320/134; 307/10.7
(58) Field of Classification Search ............... 320/116, 320/134; 307/10.7; 180/65.1
See application file for complete search history.

(56) References Cited

U.S. PATENT DOCUMENTS

| 4,135,235 | A  | * | 1/1979  | Baker ........................ 363/43 |
| 5,932,932 | A  |   | 8/1999  | Agatsuma et al. |
| 6,362,627 | B1 |   | 3/2002  | Shimamoto et al. |
| 6,633,091 | B1 |   | 10/2003 | Anzawa |

FOREIGN PATENT DOCUMENTS

| JP | 10-040770   | 2/1998  |
| JP | 10-084627   | 3/1998  |
| JP | 10-155236   | 6/1998  |
| JP | 11-248755   | 9/1999  |
| JP | 2001-076766 | 3/2001  |
| JP | 2001-292529 | 10/2001 |
| JP | 2002-281687 | 9/2002  |
| JP | 2002-291167 | 10/2002 |
| JP | 2002-315212 | 10/2002 |
| JP | 2002-325370 | 11/2002 |

* cited by examiner

*Primary Examiner*—Shawn Riley
(74) *Attorney, Agent, or Firm*—Wenderoth, Lind & Ponack, L.L.P.

(57) ABSTRACT

Capacitor unit and capacitor control system used in high output power source are reduced in size. A capacitor unit controlled by the capacitor control system is divided into capacitor blocks formed of a specified number of capacitors connected in series, and each capacitor block is provided with a detector. Plural detectors are connected to a microcomputer by way of an analog switch.

2 Claims, 4 Drawing Sheets

CAPACITOR CONTROL SYSTEM

TECHNICAL FIELD

The invention relates to a capacitor control system suitable to a capacitor unit used in high output power source.

BACKGROUND ART

Generally a capacitor unit is used as support power source for high output power source in vehicle and others mounting fuel cells, and multiple capacitors are connected in series.

When employing such capacitor unit, a capacitor control system is needed for monitoring and controlling the voltage of individual capacitors and the total voltage of entire capacitors.

Hitherto, the capacitor control system includes individual detectors for detecting the voltage of individual capacitors for composing the capacitor unit, and the information obtained from the individual detectors is processed by microcomputer. A prior art relating to the present application is disclosed, for example, in Japanese Patent Application Laid-Open No. H11-248755.

However, for processing of information corresponding to multiple capacitors by microcomputer, many ports are required in the microcomputer. To have enough ports, a plurality of microcomputers are needed, and the capacitor control system is increased in size.

It is hence an object of the invention to present a capacitor control system of small size.

In the description of the invention of the present application, the terms "capacitor" and "condenser" are used, and they are defined as synonyms. Namely, "condenser" is identical to "capacitor." In other words, they are defined as passive elements for either accumulating or discharging electric energy by capacitance. The term "condenser" is generally interpreted as meaning a heat exchanger for condensing the heating medium in a freezer, etc., but let us add that the term is not used in that sense in the present invention.

In the description of the present invention, "capacitor" is defined as a constituent element of the capacitor unit, while "condenser" is used in the sense of an electricity accumulating element constituting a "detecting unit" provided for the purpose of detecting the electric charge accumulated in the capacitor.

DISCLOSURE OF THE INVENTION

The capacitor system of the invention has a capacitor unit divided into a specified number of capacitor blocks formed by connecting a specified number of capacitors in series, and detectors are provided in individual capacitor blocks, and plural detectors and microcomputer are connected by way of analog switches.

DESCRIPTION OF THE REFERENCE NUMERALS

1 Capacitor unit
2 Capacitor
3 Capacitor block
4 Detector
5 Analog switch
6 Microcomputer
9 Condenser
10 OP amplifier
11 Transformer

DETAILED DESCRIPTION OF THE INVENTION

A preferred embodiment of the invention are specifically described below while referring to the accompanying drawings.

Preferred Embodiment 1

Figure 1:
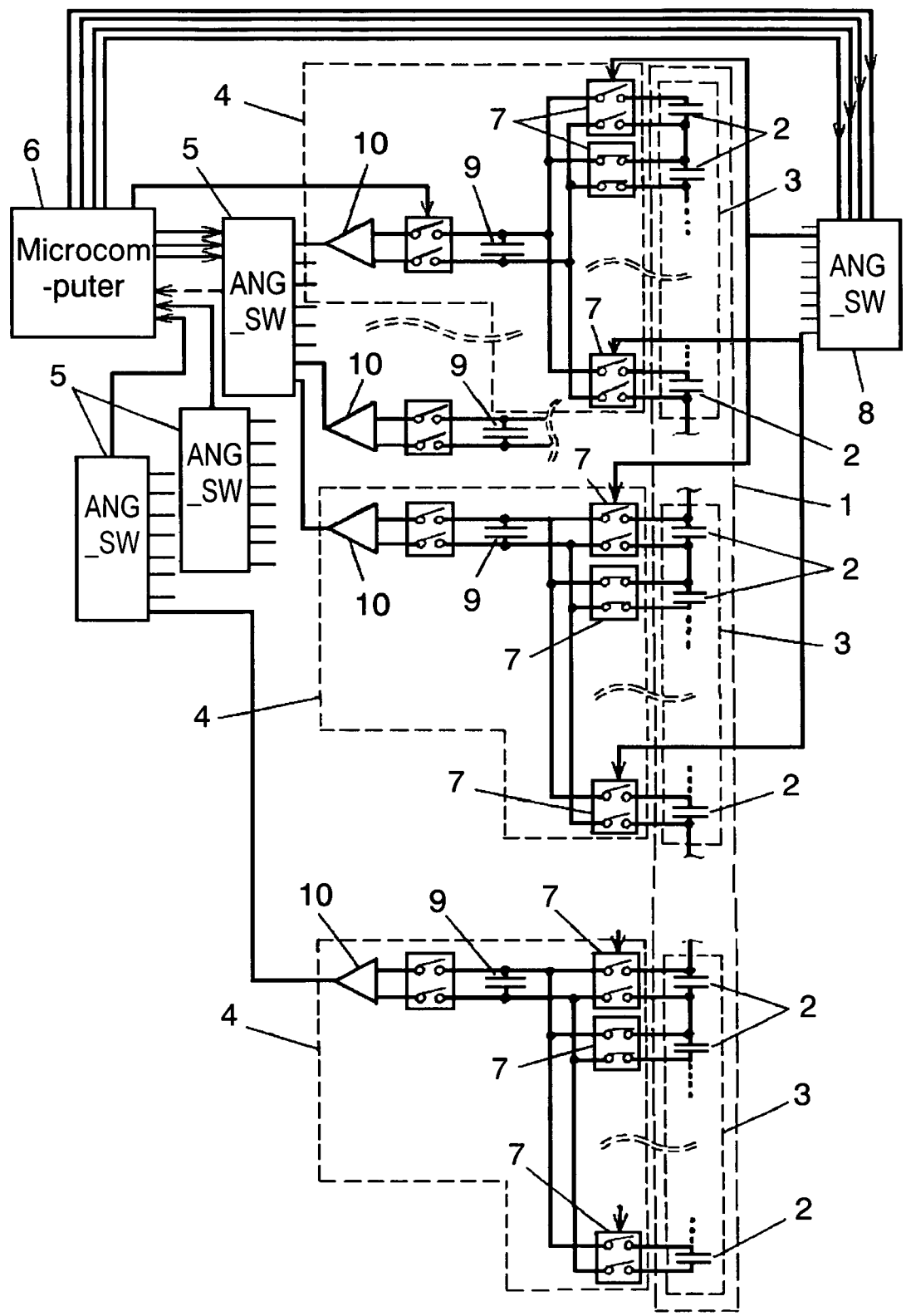
FIG. 1 is a block diagram of capacitor control system in preferred embodiment 1 of the invention.

FIG. 1 is a block diagram of capacitor control system for controlling a capacitor unit 1 used as support power source for high output power source of fuel cell vehicle.

The capacitor unit 1 is composed by series connection of multiple electric two-layer capacitors to be applicable to high voltage of hundreds of volts. Accordingly, due to fluctuations of electrical characteristics of capacitors 2 for forming the capacitor unit 1, size of accumulated voltage varies. If the accumulated voltage varies, the life of capacitor 2 to which a large voltage is applied is shorter than that of other capacitors 2. That is, the life is shortened on the whole in the capacitor unit 1. It is hence important to detect and control the voltage of each capacitor 2 and total voltage of entire capacitors 2 to extend the life by effectively utilizing the capacitor unit 1.

First of all, for detecting the voltage of capacitors 2 for composing the capacitor unit 1, the capacitor unit 1 composed of series connection of multiple capacitors 2 is divided into capacitor blocks 3 of series connection of few capacitors 2. Each capacitor block 3 is provided with a detector 4, and an analog switch 5 is connected between each detector 4 and microcomputer 6, and the capacitor control system is reduced in size. The analog switch is a switch for turning on and off an analog voltage or an analog current on the basis of a control signal. The analog switch 5 may be composed of a bipolar transistor, MOS type transistor, or other semiconductor element.

The detector 4 is designed to detect the voltage of individual capacitors 2 by selectively connecting the capacitors 2 by using a switch 7 composed of photo MOS relay and an analog switch 8 for controlling the switch 7.

Specifically, in the case of capacitor unit 1 composed of series connection of 192 capacitors 2, in this capacitor control system, three analog switches 5 corresponding to 8 channels are connected to one microcomputer 6. The detectors 4 are connected to all ports of the analog switch 5, and the capacitor block 3 of series connection of eight capacitors 2 is connected to each detector 4. The capacitors 2 for composing the capacitor block 3 are selectively connected to the detectors 4. In this configuration, the voltage of all 192 capacitors 2 can be detected by one microcomputer 6, three analog switches 5, and twenty-four detectors 4. In this configuration, the size of the capacitor control system is reduced as compared with the conventional structure.

In the detector 4, to detect the voltage of each capacitor 2, a single capacitor 2 is selected from the capacitor block 3 and connected. From this capacitor 2, the condenser 9 is charged, and after charging, the condenser 9 is isolated and separated from the capacitor 2, and the condenser 9 is connected to the OP amplifier 10, and the voltage between terminals of the condenser 9 is detected. As a result, in the capacitor unit 1 in series connection of all capacitors 2 for forming a voltage of hundreds of volts, the voltage of individual capacitors 2 can be detected as the voltage of condenser 9 isolated and separated from the high voltage portion, that is, as a small voltage. In other words, the potential difference of voltage between terminals of one capacitor 2 can be picked up. Accordingly, the OP amplifier 10 may be an ordinary one not having any special measure against high voltage.

In this detecting method, in order to heighten the precision of detection of voltage of one capacitor 2, the condenser 9 once detected is detected again, and the voltage detection precision is enhance by twice reading process.

The voltage of capacitor unit 1 can be detected by the individual voltages of capacitors 2 and the total voltage of all capacitors 2, and in first step the total voltage of all capacitors 2 is detected and then the voltages of individual capacitors 2 are detected. Second step is re-detection for preventing error in the first step, and the capacitors 2 showing abnormality in first step can be selectively detected, and the detection time is shortened. In second step, only abnormal capacitors 2 out of all capacitors may be detected. That is, only the capacitor 2 recording the maximum abnormal margin in first step is selected and detected, and the detection time is further shortened.

FIG. 2A to FIG. 2L show a series flow of detection of voltage of individual capacitors in the capacitor unit 1 composed of series connection of, for example, 192 capacitors.

Figure 2A:
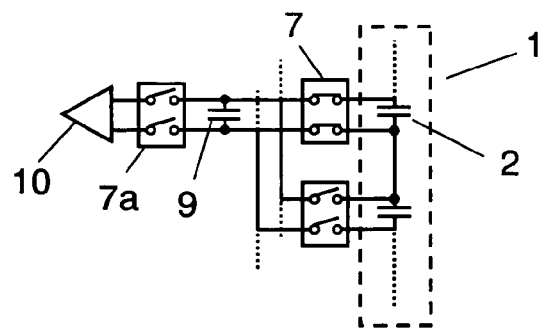
FIG. 2A is a connection diagram of capacitor and condenser, showing operation of detectors, in capacitor control system shown in FIG. 1 in preferred embodiment 1.

In FIG. 2A, one capacitor 2 out of 192 is selected by the switch 7, and the capacitor 2 is connected to the condenser 9 and controlled. The voltage accumulated between terminals of the capacitor 2 is charged in the condenser 9. At this time, other capacitors 2 are not connected to the switch 7. Switch 7a is cut off, and condenser 9 and OP amplifier 10 are disconnected.

Figure 2B:
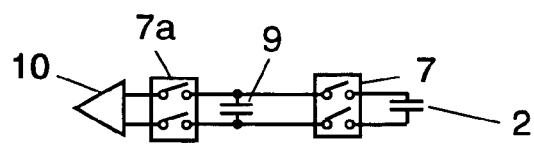
FIG. 2B is a diagram of condenser isolated and separated from the capacitor unit in the capacitor control system.

In FIG. 2B, the switch 7 is cut off, and electrical connection of capacitor 2 and condenser 9 is cut off, and the condenser 9 is isolated and separated from the capacitor unit 1, and controlled.

Figure 2C:
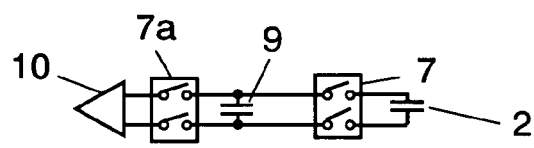
FIG. 2C is a diagram of condenser isolated and separated from the capacitor unit in the capacitor control system, and shows a state of waiting for one period.

In FIG. 2C, after waiting for one period from FIG. 2B, the state is same as in FIG. 2B, but the switch 7 and OP amplifier 10 are both cut off, and the condenser 9 and OP amplifier 10 are isolated and separated from the capacitor unit 1, and completely controlled independently.

Figure 2D:
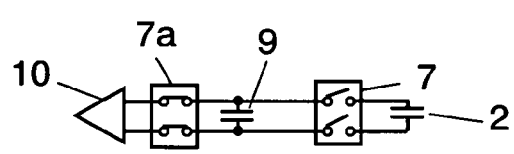
FIG. 2D is a connection diagram of condenser and OP amplifier in the capacitor control system.

In FIG. 2D, the switch 7a is connected in the state in FIG. 2C, and the voltage accumulated in the condenser 9 is entered in the OP amplifier 10, and this voltage is detected by the OP amplifier 10.

Figure 2E:
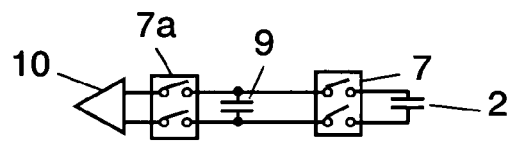
FIG. 2E is a diagram of condenser isolated and separated from OP amplifier in the capacitor control system.

In FIG. 2E, the switch 7a is disconnected in the state in FIG. 2D, and the condenser 9 is isolated from the OP amplifier 10.

Figure 2F:
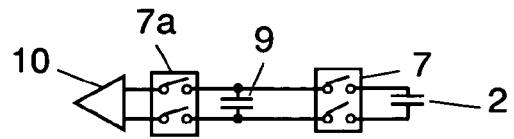
FIG. 2F is a diagram of condenser isolated and separated from OP amplifier in the capacitor control system, and shows a state of waiting for one period.

In FIG. 2F, after waiting for one period from FIG. 2E, the state is same as in FIG. 2E, but the switch 7 and switch 7a are cut off, and the condenser 9 is isolated, thereby waiting for one period until the voltage is stabilized.

Figure 2G:
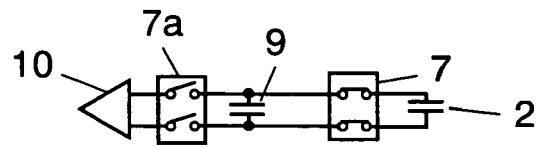
FIG. 2G is a connection diagram of capacitor and condenser, in twice reading process, showing the operation of detector, in the capacitor control system.

In FIG. 2G, second reading process is shown in order to enhance the precision of detection of voltage accumulated in capacitors 2. That is, the control state is same as in FIG. 2A, and the condenser 9 is connected again to the capacitor 2 and charged again.

Figure 2H:
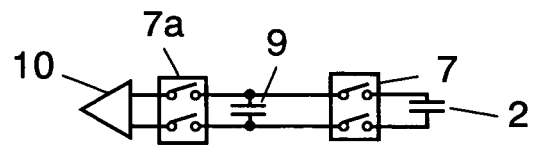
FIG. 2H is a diagram of condenser isolated and separated from the capacitor unit, in twice reading process, in the capacitor control system.
Figure 2I:
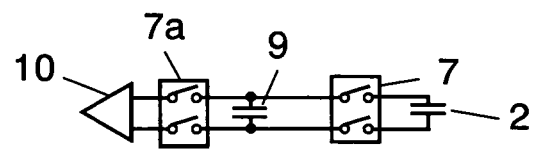
FIG. 2I is a diagram of condenser isolated and separated from the capacitor unit, in twice reading process, in the capacitor control system, and shows a state of waiting for one period.

FIG. 2H and FIG. 2I are the same control state as in FIG. 2B and FIG. 2C. That is, in FIG. 2H, the condenser 9 is isolated from the capacitor unit 1 and controlled, and in FIG. 2I, the condenser 9 is completely held independently, thereby waiting for one period until the voltage is stabilized.

Figure 2J:
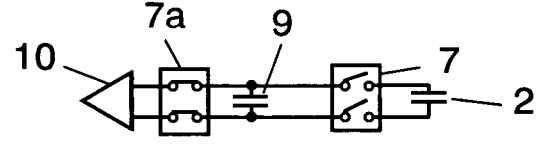
FIG. 2J is a connection diagram of capacitor and condenser, in twice reading process, showing the operation of detector, in the capacitor control system.

FIG. 2J is same control state as shown in FIG. 2D. That is, the switch 7a is connected, and the condenser 9 is connected again to the OP amplifier 10, thereby detecting again the voltage accumulated in the condenser 9.

Figure 2K:
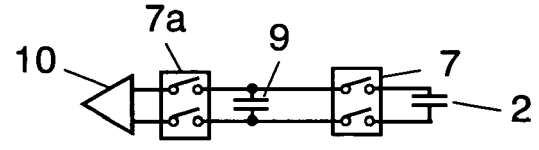
FIG. 2K is a diagram of condenser isolated and separated from OP amplifier, in twice reading process, showing the operation of detector, in the capacitor control system.
Figure 2L:
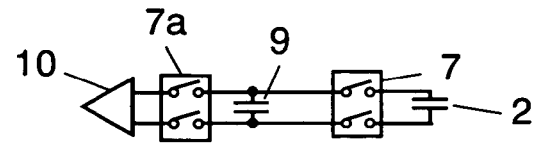
FIG. 2L is a diagram of condenser isolated and separated from OP amplifier, in twice reading process, showing the operation of detector, in the capacitor control system, and shows a state of waiting for one period.

FIG. 2K and FIG. 2L are the same control state as in FIG. 2E and FIG. 2F. That is, in FIG. 2K, the condenser 9 is isolated from the OP amplifier 10.

FIG. 2L is substantially same as the connection state as in FIG. 2K, but the switch 7 and switch 7a are cut off, and the condenser 9 is disconnected from the capacitor unit 1, and is completely isolated and independent, thereby waiting for one period until the voltage is stabilized.

In the flow of control of capacitors shown from FIG. 2A to FIG. 2L, supposing the control period of microcomputer 6 shown in FIG. 1 to be set, for example, at 6 ms duration of 72 ms is needed for control of 12 steps shown in FIG. 2A to FIG. 2L. To detect all of 192 capacitors 2 by parallel processing using three analog switches 5, detection time of 4608 ms =(72×192)/3 is needed.

When this detection is repeated (two cycles), detection time of 4608 ms×2=9216 ms is needed. According to the invention, moreover, in addition to the first detection time of 4608 ms, only 72 ms is required for re-detection of abnormal capacitors 2, and only a total of 4608+72=4680 ms is enough for detection of capacitor unit 1, and the detection time can be shortened substantially.

Preferred Embodiment 2

Figure 3:
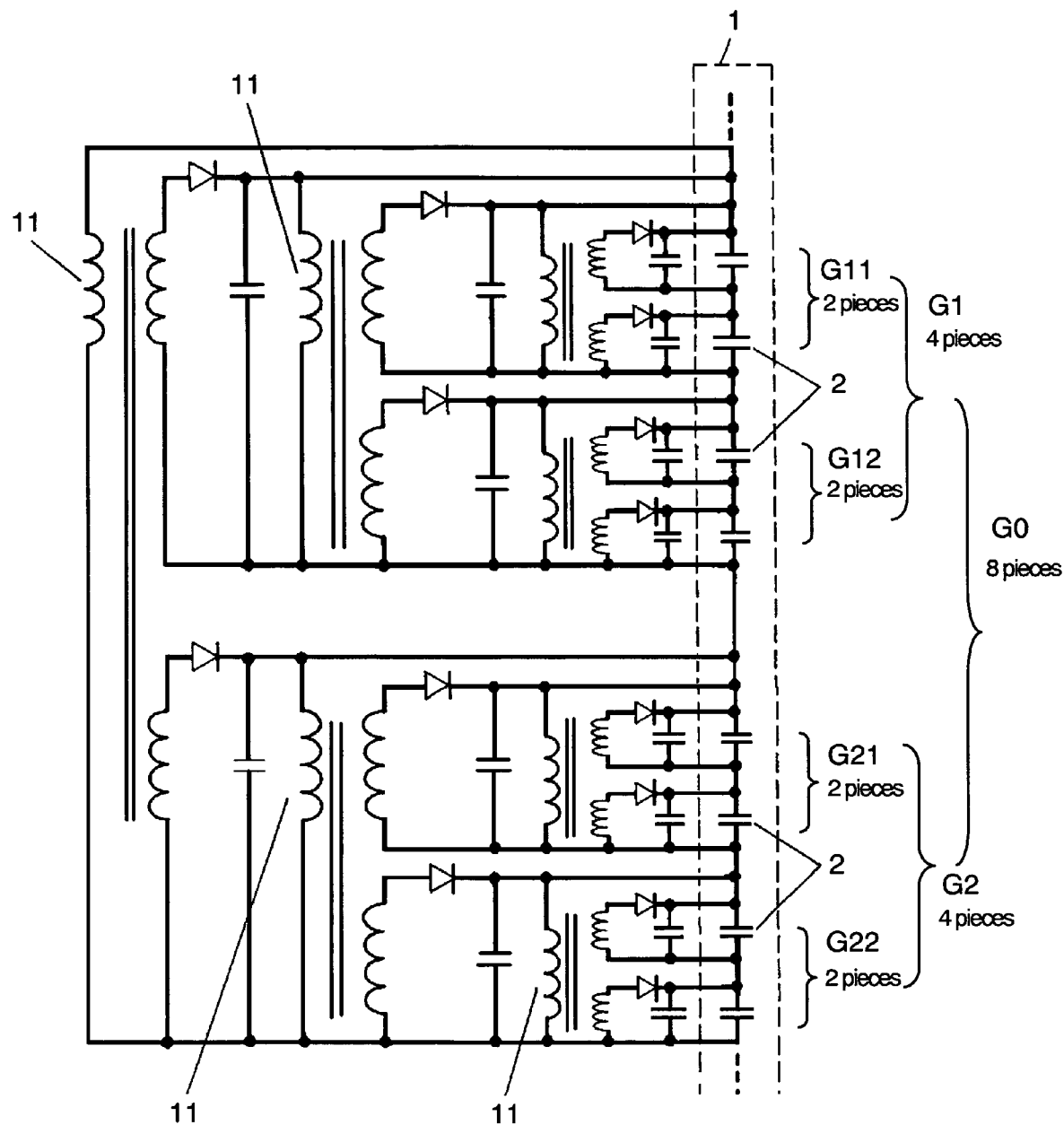
FIG. 3 is a diagram of equalizing operation of capacitors in capacitor control system in preferred embodiment 2.

FIG. 3 is a diagram of voltage equalizing operation of capacitors in capacitor control system. In the capacitor control system shown in FIG. 2A to FIG. 2L, after detection of voltage fluctuations of capacitor 2 and other capacitors 2 in capacitor unit 1, fluctuations are equalized, that is, the capacitor voltage is equalized. That is, voltages of capacitors 2 are equalized. This is because voltage equalization of capacitors 2 is important for assuring the specified energy of capacitor unit 1 and exhibiting the accumulated amount of capacitors 2 to maximum extent.

As an example of the invention, suppose the capacitor unit 1 is composed of series structure of 192 capacitors. A total of 192 is roughly divided into 128 and 64, and each group is sequentially and hierarchically divided into half units.

A group of 128 is a seventh power of 2 (=128), counting 128, 62, 32, 16, 8, 4, and 2, and is two pieces at seventh layer, and a group of 64 is a sixth power of 2(=64), and is two pieces at sixth layer. FIG. 3 shows four and eight capacitors, from two capacitors of lowest layers G11, G12, G21, and G22, to two layers back G0.

In FIG. 3, when excitation energy is applied to the primary side of the leftmost transformer 11, since two windings are aligned at the secondary side of transformer, same voltage is applied to both.

As a result, transformer 11 of next layer is excited, and excitation is similarly transmitted sequentially. Since two windings of the secondary side are aligned, by exciting the transformer of the higher layer, same voltage can be applied all to the secondary side of the lowest layer.

Each capacitor is charged up to (V11−Vd), where V11 is secondary side winding voltage, and Vd is forward voltage of diode. As a result, voltages of all capacitors are equalized.

That is, the series structure of capacitors 2 forming the capacitor unit 1 is divided, and each number is equalized, and the equalized series structure is further divided, and equalized. By repeating this process, the capacitors 2 are equalized sequentially from large set to small set, and the accumulated amount of all capacitors 2 can be equalized efficiently.

When dividing the series structure of capacitors 2 by equalizing the capacitors 2, by dividing into two, each group is set in same number, that is, equal division method is employed. Instead of such equal division, same action and effect are obtained by properly changing the circuit configuration of transformer 11.

During such capacity voltage equalizing process, voltages of capacitors 2 are unstable. If voltage of capacitors 2 is detected at this time, the detection is not correct. It is hence important to control so as not to detect and equalize at the same time. That is, detection shown in FIG. 2A to FIG. 2L, and capacitor voltage equalizing shown in FIG. 3 should not be executed at the same time.

Meanwhile, in the capacitor unit 1 used in such fuel cell vehicle, the electric power necessary for voltage detection or equalizing in ignition ON state may have effects on fuel expenses of fuel cell vehicle, and it is hence preferred to control so as not to detect voltage or equalize the capacitors 2 in such state.

When detecting or equalizing capacitor voltages in ignition OFF state, since the electric power accumulated in the battery or capacitors 2 as driving source is consumed, the charge amount of battery or capacitor unit 1 drops suddenly. Control for suppressing such phenomenon is demanded.

To control for realizing such effect, for example, the capacitor voltages are detected or equalized when the total voltage accumulated in the capacitor unit 1 is more than a specified value. When the total voltage is less than a specified value, detecting or equalizing operation of capacitor voltages is stopped, and drop of charge amount is suppressed, or when equalizing the capacitors 2, the rotating speed may be suppressed and controlled.

At the time of detection of capacitor voltages, if a voltage exceeding an allowable value of capacitors 2 is detected, such information may be transmitted from the microcomputer to outside. As a result, charging of capacitor unit 1 or detection or equalizing of capacitors 2 may be stopped, and the electric charge may be drawn out from the capacitors 2. As a result, the safety may be enhanced in the capacitor system 1 and the fuel cell vehicle or devices using the same.

The capacitor control system of the invention is reduced in size, and is particularly useful in vehicle and other applications demanded to be reduced in size, and hence its industrial applicability is outstanding.

The invention claimed is:

1. A capacitor control system comprising:
    a capacitor unit having a plurality of capacitors connected in a series connection, said capacitor unit being divided into capacitor blocks formed of a specific number of the plurality of capacitors connected in a series connection;
    a plurality of detectors provided in the capacitor blocks; and
    a microcomputer configured to be connected to said plurality of detectors by way of an analog switch for processing information obtained from said plurality of detectors,
    wherein said plurality of detectors select arbitrary capacitors in the capacitor blocks and a voltage of the capacitors charges a condenser provided in said plurality of detectors, the condenser is isolated from a respective capacitor block, and said plurality of detectors determine the voltage of the isolated condenser, and said plurality of detectors detect voltages of the capacitors such that each of said plurality of detectors detect in each capacitor block connected, after once detecting all capacitors in a first detection, selectively the capacitors showing an abnormal voltage value in the first detection in a second detection.

2. The capacitor control system of claim 1, further comprising
    an equalizing operation of equalizing voltage capacitors followed by dividing the capacitors forming said capacitor unit into a plurality of first capacitor blocks in which capacitors are connected in series, equalizing the voltage of the divided first capacitor blocks, dividing each of the equalized first capacitor blocks further into a plurality of second capacitor blocks, each of the second capacitor blocks including at least one capacitor, equalizing the voltage of the divided second capacitor blocks, and repeating the dividing of the capacitor blocks and the equalizing of voltage until the voltage of the capacitors forming said capacitor unit are equalized; and
    a detecting operation of capacitor voltages by using said plurality of detectors,
    wherein the equalizing operation and the detecting operation are executed in time division.

* * * * *